United States Patent [19]

Hurkmans

[11] 4,184,614

[45] Jan. 22, 1980

[54] DOUGH DISTRIBUTION MACHINE

[76] Inventor: Antonius Hurkmans, 71 Prof. Buyslaan, 3741 DB Baarn, Netherlands

[21] Appl. No.: 951,867

[22] Filed: Oct. 16, 1978

[30] Foreign Application Priority Data

Oct. 21, 1977 [NL] Netherlands .......................... 7711612

[51] Int. Cl.² ............................................... A21C 5/02
[52] U.S. Cl. ..................................... 222/190; 222/217;
222/381; 141/81; 100/218; 425/238
[58] Field of Search ................ 222/252, 372, 381, 309,
222/190, 217, 205, 346, 351; 141/81, 249;
53/529, 516; 100/DIG. 5, 264, 215, 218;
425/238–240, 436, 444

[56] References Cited

U.S. PATENT DOCUMENTS

| 1,763,345 | 6/1930 | Devlin | 425/238 |
| 2,324,202 | 7/1943 | Felton | 222/217 X |
| 2,383,536 | 8/1945 | Elliott | 222/217 X |
| 2,498,100 | 2/1950 | Tyrrell | 222/217 X |
| 3,485,187 | 12/1969 | Benier | 425/238 |

Primary Examiner—Allen N. Knowles
Attorney, Agent, or Firm—Ostrolenk, Faber, Gerb & Soffen

[57] ABSTRACT

A machine for the distribution of dough or a similar viscous material, comprising a hopper with an end plane along which a distribution head is driven sealingly, its first position causing an open connection with the outlet of the hopper. The distribution head comprises a movable expeller in a pressure chamber, so interacting during a second position of the distribution head, with a storage chamber, comprising a piston under pressure, that an accurately metered portion of dough is received under pressure in said storage chamber, this portion being expelled when the position of the distribution head changes.

5 Claims, 10 Drawing Figures

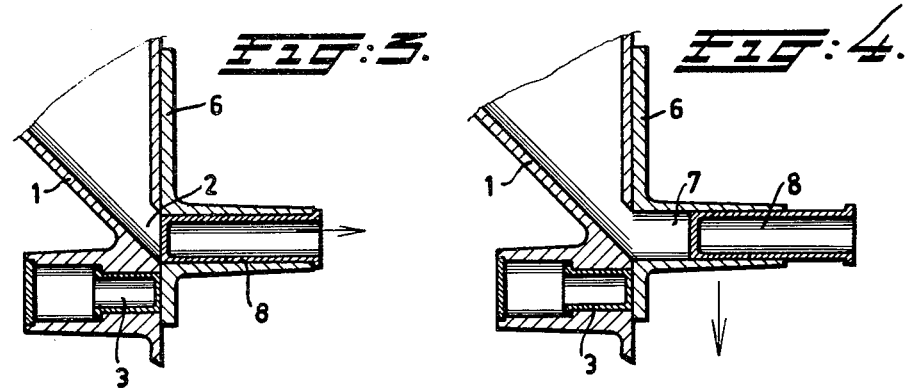
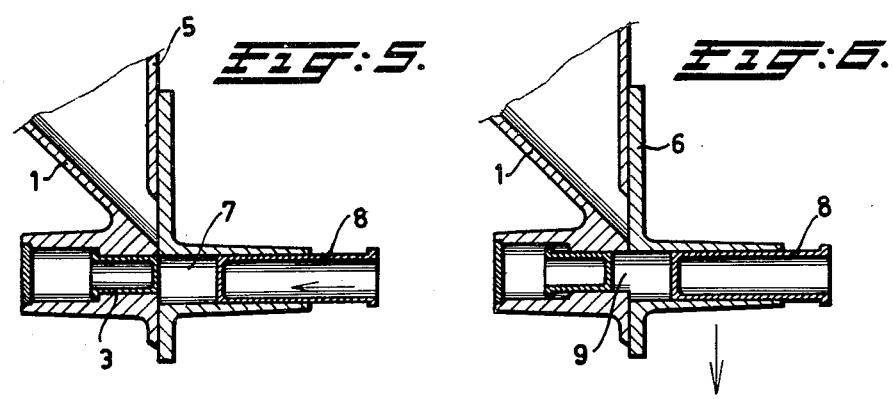
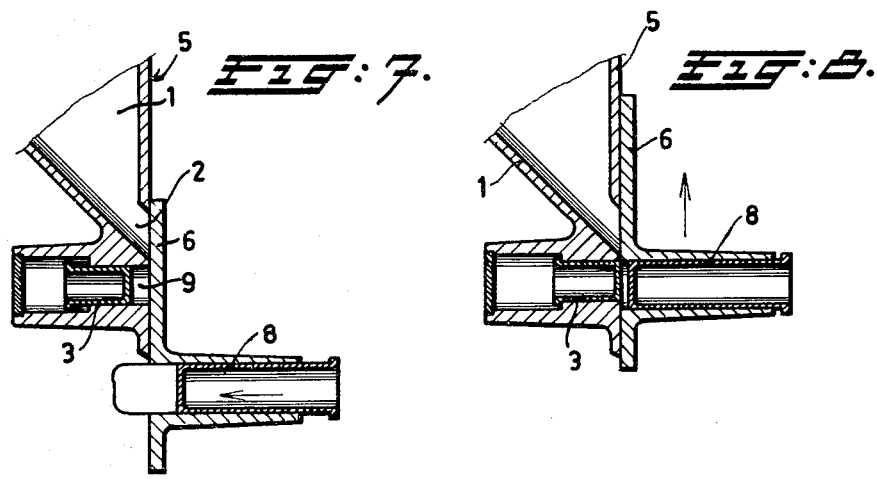

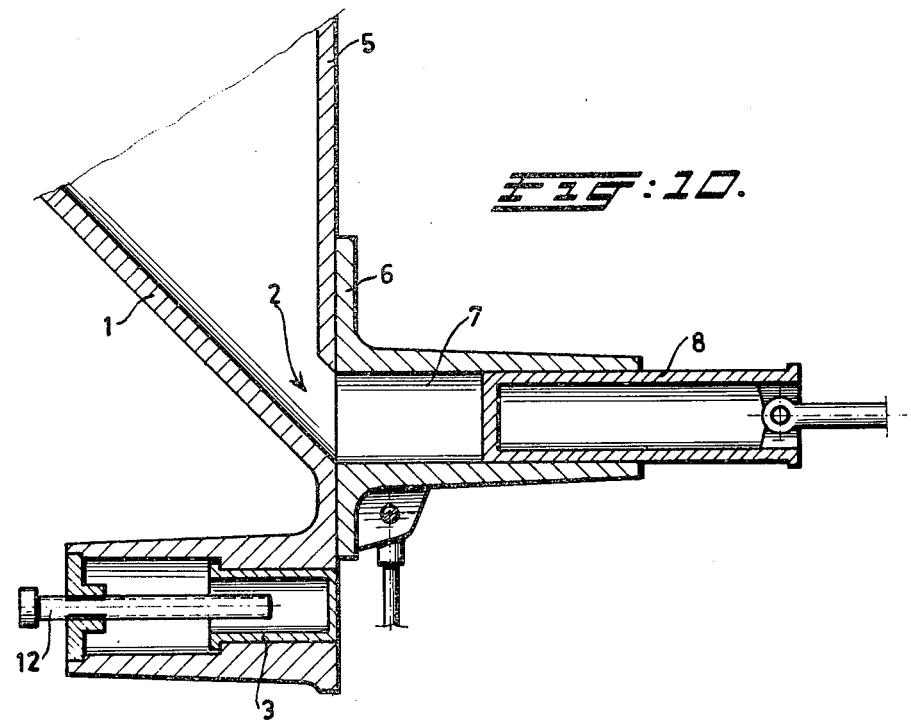
Fig: 10.
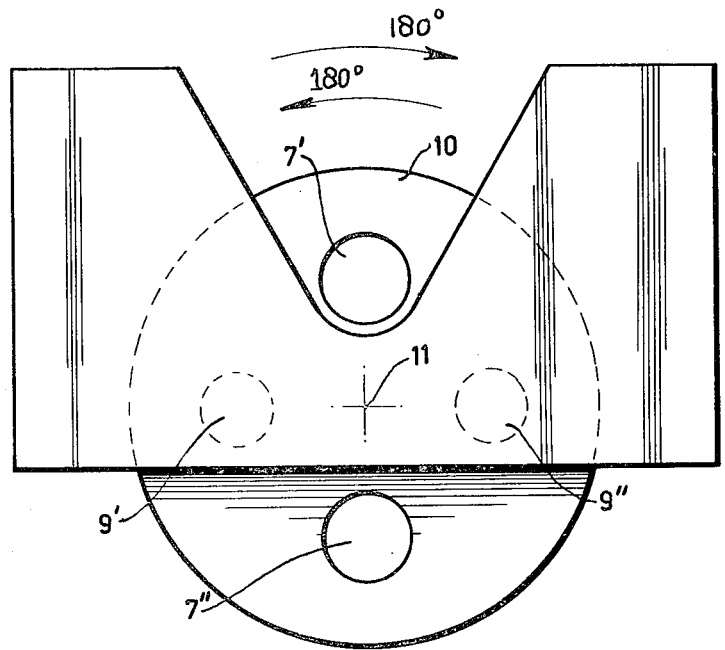
Fig: 9.

DOUGH DISTRIBUTION MACHINE

BACKGROUND OF THE INVENTION

The invention relates to a machine for the distribution of dough or similar viscos material comprising a hopper with an outlet and a distribution head with at least one pressure chamber and a dough expeller movable therein, said distribution head reciprocating in a sealing manner along the end face of the outlet of the hopper, the pressure chamber in a first position of said head being in open connection with the outlet of the hopper in order to receive an amount of dough from the stock through the withdrawal of the dough expeller, said expeller being able to eject at least part of the received dough amount in another position of the distribution head.

Dough distribution machines should be capable of metering portions of dough of an accurately adjustable and constant weight. In the course of this metering operation, the initial cell structure of the dough to be distributed is maintained as much as possible. The accuracy of the weight of the metered portions of dough is highly dependent upon the pressure exercised on the dough during said distributing operation. In order to reduce the rate of damages to the cell structure of the dough during said distribution operation, it should be avoided that severe underpressures or rapid falls in pressure occur in the dough during the distributing or metering operation. It should also be avoided that at the beginning or at the end of the metering operation the dough is pressed through a narrow slit.

SUMMARY OF THE INVENTION

It is an object of the invention to provide a distribution machine in which the above mentioned demands are taken into account. According to the invention, this object is achieved in that there is provided at least one storage chamber with a piston under pressure, which chamber in a second position of the distribution head cooperates with the pressure chamber for receiving under pressure a portion of the amount of dough stored in the pressure chamber so as to accurately define the desired portion of dough, this portion being expelled in another position of the distribution head.

As a result of these features firstly a somewhat too large amount of the dough is supplied to the pressure chamber and brought under pressure, whereafter the correct volume of the desired portion of dough is adjusted by means of the storage chamber, while maintaining the pressure exercised on the dough. Finally, the portion thus separated is delivered for further transport.

In principle, there are two possibilities for volumatrically defining the desired portion of dough, to wit:

in the storage chamber, in that the stroke of the piston pressed backward by the dough is bounded by an adjustable abutment in said storage chamber or, in the pressure chamber in that the stroke of the dough expeller, after bringing the dough under pressure, is limited to an adjustable value.

In the first possibility, the first and the other position of the distribution head coincide while the storage chamber is in open connection with the ambient air so that the piston may expel the desired portion of dough from this storage chamber while the pressure chamber takes up a fresh amount of dough. In that case, the surplus dough will be in the pressure chamber and be united with the subsequent withdrawal of dough from the hopper. This embodiment offers the advantage of a large delivery capacity.

In the second of the above mentioned possibilities, the other position of the distribution head consists of an open connection between the pressure chamber and the ambient air, so that the dough expeller may eject the desired portion of dough from said pressure chamber, while the storage chamber contains the surplus dough. The surplus dough is temporarily received in the storage chamber and taken up into the (empty) pressure chamber during its return stroke movement, and hereafter mixed with the subsequent amount of dough withdrawn from the hopper. This embodiment offers the advantage that the surplus dough of an operational cycle is absorbed by the portion of dough to be delivered in the next cycle.

An increase of the production capacity of the latter embodiment of the distribution machine is brought about by arranging a storage chamber on either side of the outlet of the hopper and by providing the distribution head with two pressure chambers, this head being movable in three positions along the outlet and along the storage chambers.

SURVEY OF THE DRAWINGS

FIGS. 3-8 show schematically six stages during operation of the machine of FIG. 1.

FIG. 9 shows schematically a third variant in elevational view and in section according to a vertical plane, which stands perpendicularly on the plane of the drawing of FIGS. 1 and 2.

FIG. 10 is a vertical longitudinal elevation of a single acting dough distribution machine according to a fourth variant in which the dough volume is defined by a limitation of the stroke of the piston of the storage chamber.

DESCRIPTION OF A PREFERRED EMBODIMENT

Figure 1:
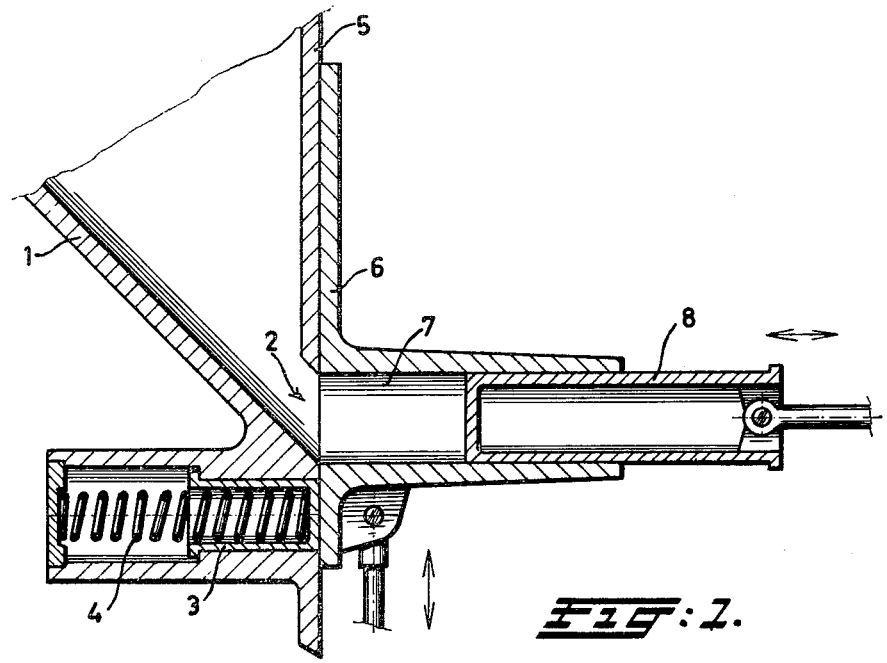
FIG. 1 is a vertical longitudinal elevation of a single acting dough distribution machine according to a first variant, in which the dough volume is defined by a limitation of the stroke of the dough expeller.

The dough distributer illustrated in FIG. 1 comprises a hopper 1 having an outlet 2 and a piston 3. This piston is charged with a certain power exercised by any suitable means. By way of example, this power is exercised by a spring 4 as shown in the drawing. Along the end plane 5 of the hopper 1 a distribution head 6 is moving by means of any suitable drive mechanism. This distribution head comprises a pressure chamber 7 with a movable expeller 8 therein, also operated by any suitable drive mechanism. The piston 3 bounds a storage chamber 9.

In FIG. 3 the distribution head 6 is illustrated in a position whereby the front of the expeller 8 is in open connection with the outlet 2 of the hopper 1. The suction of dough from the stock into the hopper may now commence.

In FIG. 4 the expeller 8 has conducted a certain amount of dough into the pressure chamber 7. The distribution head 6 is moved toward the position of FIG. 5.

In FIG. 5 the sucked in dough is separated from the stock and is enclosed by the heads of the expeller 8 and the surplus piston 3 and by the walls of the pressure chamber 7. The expeller 8 may now exercise pressure on the dough.

In FIG. 6 the expeller 8 has moved into the direction of the separation plane 5 toward a predetermined position, thereby excercising pressure on the dough. The pressure of the dough, however, cannot exceed the pressure on the surplus piston 3 which is in balance with the power exercised on the surplus piston, for instance as produced by the spring 4 in FIGS. 1 and 2. The surplus dough is pressed into the storage chamber 9. In the pressure chamber 7 there is a certain volume of dough with a pressure being defined by the force on the surplus piston 3. This renders it possible to comply with both conditions for obtaining an accurate dough weight, that is to say a defined volume combined with a defined dough pressure.

In FIG. 7, the distribution head 6 has arrived in the position in which the pressure chamber 7 has come in open connection with the ambient air. The expelling movement is completed when the front of the expeller 8 has reached the separation plane 5. The distribution head 6 may then commence the return movement while the expeller 8 is released of any driving power. The return movement of the distribution head 6 causes the front of the released expeller 8 to come in open connection with the surplus chamber 9, still including the surplus dough injected therein during the foregoing pressing movement.

In FIG. 8 the force on the piston 3 has pushed back the surplus dough from the storage chamber 9 toward the pressure chamber 7, the now discharged expeller 8 being likewise pushed back. In the further return return movement of the distribution head 6, the dough pushed back into the pressure chamber 7 is carried along till the position illustrated in FIG. 3 has been reached. During the subsequent withdrawal of the expeller 8, fresh dough is sucked in from the stock, part of which will come in the storage chamber 9 during the pressing of the dough.

The operation of the machine has been described with reference to the various positions during the distribution cycle. However, it does not alter the principle of the machine whether the distribution head and the expeller indeed move, intermittently (step by step) in the three positions mentioned above or whether the movements are uninterrupted and thus merge into each other more or less smoothly so that a more continuous movement is brought about.

Figure 2:
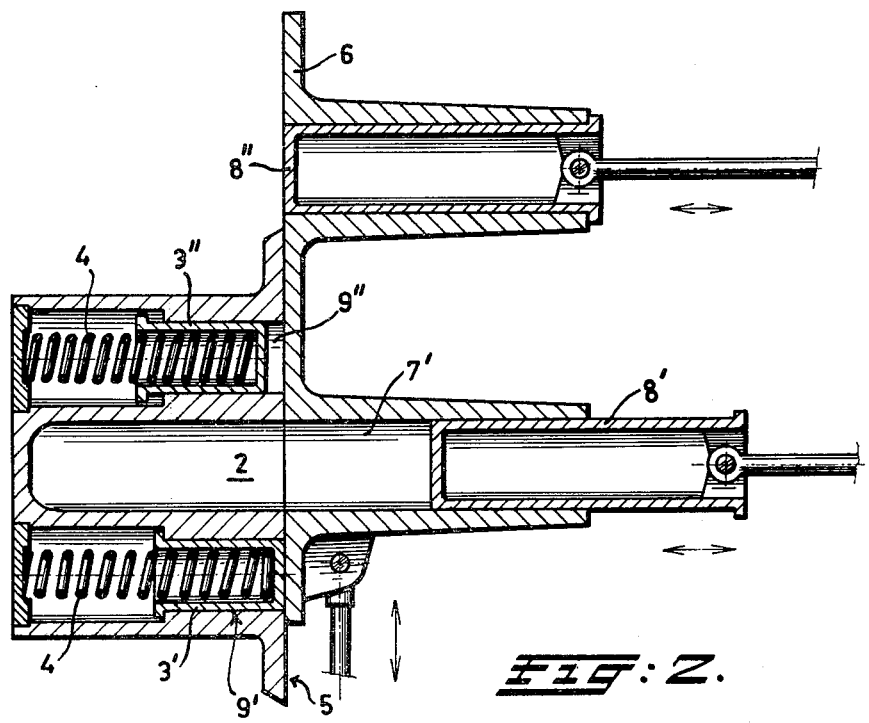
FIG. 2 is a horizontal section of a double acting machine of the second variant, the dough volume also being defined by a limitation of the stroke of the dough expeller.

FIG. 2 illustrates schematically an embodiment of the dough distributer provided with two pressure chambers 7' and 7". Adjacent the hopper 1 two pistons 3' and 3" and in the distribution head 6 two dough expellers 8' and 8" are arranged. During the reciprocating movement of the distribution head both pressure chambers come one after the other, in open connection with the outlet 2 of the hopper and with the corresponding storage chamber 9' and 9". This occurs such, that when one pressure chamber is in open connection with the outlet 2 of the hopper, the other pressure chamber is in open connection with the ambient air.

For clarity's sake, FIG. 2 shows a distribution head performing a rectilinear movement. Especially in the case of the double embodiment, however, a circular movement of the distribution head is of advantage, in which case the distribution head oscillates over 180° during a distribution cycle.

The third variant is illustrated in FIG. 9. The two pressure chambers 7' and 7" together with the expellers 8' and 8" are incorporated in a disk-shaped plate 10 which may turn around a central axis 11. In the illustrated position, an amount of dough is received in the pressure chamber 7', the accurately metered portion of dough being expelled from the pressure chamber 7". After a rotation of 90° in a direction against the hands of a clock, the pressure chamber 7' is positioned in front of the storage chamber 9'. Subsequently the right volume of the portion of dough is adjusted in the pressure chamber 7', while the expeller 8" at the other side receives back in the pressure chamber 7" the surplus dough from the storage chamber 9". The surplus dough is pushed back to the pressure chamber by the surplus piston under pressure. The dough expeller is pushed back thereby and constitutes here the passive element.

The disk 10 then rotates again over 90° in the direction indicated whereby the pressure chamber 7' comes in connection with the ambient air and the expeller 8' may deliver the portion of dough. The expeller 8" simultaneously draws an amount of dough from the hopper 1, whereafter the direction of travel is reversed and the disk 10 will move twice over 90° in the direction of the hands of a clock for carrying out a following cycle.

The dough distributor shown in FIG. 10 has an adjustable abutment, for instance a screw spindle 12, bounding the stroke of the piston 3. In the position illustrated in FIG. 10, the dough expeller 8 has drawn dough from the hopper 1. In a second position, the pressure chamber 7 is in open connection with the storage chamber 9, whereafter the dough is displaced and brought under pressure by the dough expeller 8. The piston 3 is then pushed back till the abutment. Part of the dough drawn, remains in the pressure chamber 7.

Subsequently the distribution head 6 returns to the position illustrated. Hereafter the drawing of dough by the dough expeller 8 and the expulsion of the portion of dough by the piston 3 may take place again simultaneously.

What is claimed is:

1. A machine for the distribution of dough or similar viscos material, comprising a hopper with an outlet, a distribution head with at least one pressure chamber and a dough expeller movable therein, the said distribution head reciprocating in a sealing manner along the end face of the outlet of the hopper, the pressure chamber in a first position of said head being in open connection with the outlet of the hopper in order to receive an amount of dough from the stock through the withdrawal of the dough expeller, said expeller being able to eject at least part of the received dough amount in another position of the distribution head, at least one storage chamber with a piston under pressure being provided, which chamber in a second position of the distribution head cooperates with the pressure chamber for receiving under pressure a portion of the amount of dough stored in the pressure chamber, so as to define accurately the desired portion of dough, this portion being expelled in another position of the distribution head.

2. The distribution machine of claim 1, wherein the first and the other position of the distribution head coincide, the storage chamber being in open connection with the ambient air so that the piston may expel the desired portion of dough from this storage chamber while the pressure chamber takes up a fresh amount of dough.

3. The distribution machine of claim 1, the other position of the distribution head comprising an open connection between the pressure chamber and the ambient air so that the dough expeller may eject the desired amount of dough from this pressure chamber, while the storage chamber contains the surplus dough.

4. A distribution machine as defined in claim 3, wherein a storage chamber is arranged on either side of the outlet of the hopper the distribution head being provided with two pressure chambers, this head being movable along the outlet and the storage chambers, in three positions.

5. The distribution machine of claim 4, wherein the outlet and the storage chambers are arranged at the same radial distance from a central axis while the distribution head may make an oscillating movement around the said axis.

* * * * *